United States Patent [19]

Cola

[11] Patent Number: 4,745,891
[45] Date of Patent: May 24, 1988

[54] OTTO CYCLE INTERNAL COMBUSTION ENGINE GIVING INCREASED PERFORMANCE

[76] Inventor: Umberto Cola, Via Giovanni Papini, 32 Roma, Italy, 00137

[21] Appl. No.: 883,128

[22] Filed: Jul. 8, 1986

[30] Foreign Application Priority Data

Sep. 10, 1985 [IT] Italy ................................ 48542 A/85

[51] Int. Cl.[4] ................................................ F02F 3/26
[52] U.S. Cl. ................................ 123/193 P; 123/256; 123/279; 123/310
[58] Field of Search ............ 123/193 P, 193 CP, 276, 123/279, 306, 307, 309, 310, 262, 263, 256

[56] References Cited

U.S. PATENT DOCUMENTS

| | | | |
|---|---|---|---|
| 1,658,464 | 2/1928 | Rushmore | 123/191 |
| 2,324,705 | 7/1943 | Huber | 123/310 |
| 2,827,033 | 3/1958 | Bodine | 123/191 |
| 2,881,743 | 4/1959 | Holt | 123/276 |
| 3,144,008 | 8/1964 | List | 123/276 |
| 4,294,207 | 10/1981 | May | 123/306 |
| 4,366,789 | 1/1983 | Eckert | 123/263 |

FOREIGN PATENT DOCUMENTS

| | | |
|---|---|---|
| 2647091 | 4/1978 | Fed. Rep. of Germany . |
| 108662 | 1/1959 | Pakistan ................................ 123/263 |
| 255337 | 7/1926 | United Kingdom . |
| 793084 | 4/1958 | United Kingdom . |
| 833683 | 4/1960 | United Kingdom . |

Primary Examiner—Ira S. Lazarus
Assistant Examiner—M. Macy
Attorney, Agent, or Firm—Darby & Darby

[57] ABSTRACT

Disclosed is an improvement whereby performance of an internal combustion engine, an Otto cycle engine in particular, is increased by the provision of two distinct in-piston combustion chambers (2, 3) per cylinder these take the form of pockets (4, 5) dissimilar in volume, sunk into the crown (6) of each piston (1) in position directly beneath the inlet and exhaust valves (7, 8) and provided each with a spark plug (13). In a preferred embodiment, such pockets (4, 5) exhibit the shape of sector to an annulus, and their side walls (9, 10) are splayed in such a way as to enhance circulation and escape of combustion gases.

8 Claims, 1 Drawing Sheet

4,745,891

OTTO CYCLE INTERNAL COMBUSTION ENGINE GIVING INCREASED PERFORMANCE

BACKGROUND OF THE INVENTION

The invention relates to an improvement in the design of an internal combustion engine the purpose of which is to give increased performance, and concerns Otto cycle engines in particular. The current state of the art in this field is such, that if greater output and speed are to be obtained from an internal combustion engine, and from classic Otto cycle or Diesel units in particular, a greater quantity of fuel must be consumed, and additional devices such as turbochargers or mechanically driven positive compression aids must be fitted.

Also, the polluting effect of exhaust emission can be reduced, currently, only by employing catalytic type silencers; these are costly however, and betray engineering disadvantages as regards working temperature, loss of engine output, and long-term dependability.

In the search for low specific fuel consuption and simultaneous reduction in emission levels, good results have been obtained adopting weak fuel mixtures and high compression ratios. The poor ignition properties of a weak mixture and its tendency to detonate at high compression ratios are remedied conventionally by creating swirl (turbulence set up in the mixture by vents lying tangential to the combustion chamber) or squish (compaction and concentration of the mixture around the spark plug), or by adopting special designs of piston crown.

The object of the invention described herein is that of improving the internal combustion engine, and in particular the classic Otto cycle unit, in order to increase performance without the need for specially designed and costly additional services.

SUMMARY OF THE INVENTION

The stated object is achieved, according to the improvement described and claimed herein, by providing two distinct in-piston combustion chambers per single cylinder of the engine, located in positions corresponding to the positions of the inlet and exhaust valves. Such chambers are of dissimilar volume and provided each with a respective spark plug, in the case of an engine utilizing spark ignition.

One of the advantages gained with the improvement in question consists in the possibility of embodying an engine capable of generous performance, without incorporating costly additional supercharge devices, and dispensing with catalytic silencers and their attendant engineering drawbacks.

BRIEF DESCRIPTION OF THE DRAWINGS

An embodiment of the invention will now be described in detail by way of example, with the aid of the accompanying drawings, in which.

DESCRIPTION OF THE PREFERRED EMBODIMENT

In an improved internal combustion engine according to the invention, each piston 1 is provided with two distinct combustion chambers 2 and 3.

Figure 1:
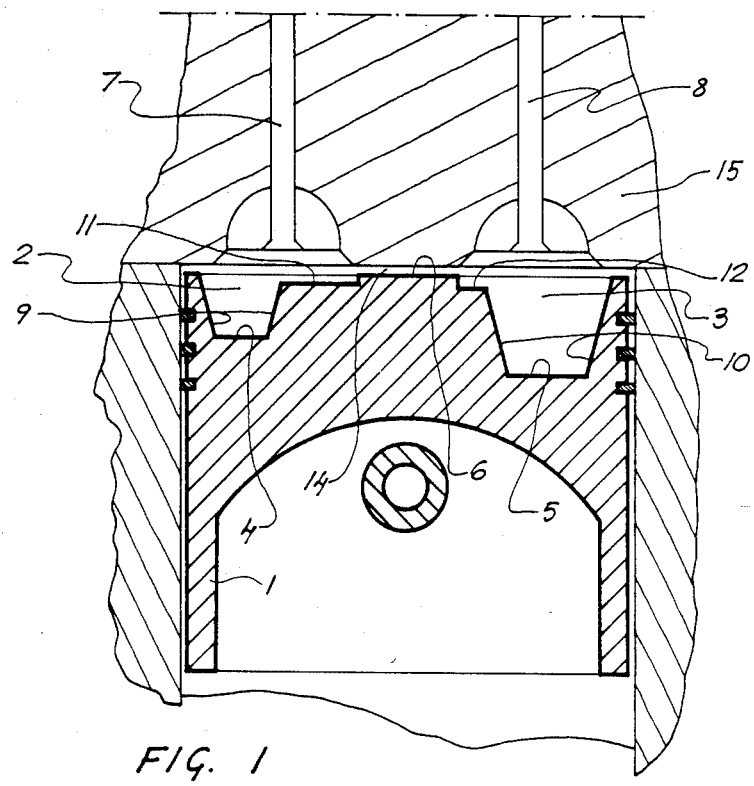
FIG. 1 is an axial section through the combustion chambers of a piston as envisaged in an improved IC engine according to the invention.

When the piston 1 is at top dead centre as in FIG. 1, the two chambers intercommunicate by way of a gap 14 existing between the crown 6 of the piston 1 and the cylinder head 15.

The chambers 2 and 3 take the form of two pockets 4 and 5 of dissimilar volume sunk into the crown 6 of the single piston 1. The relationship in volume between the one pocket 4 and the other 5 will depend substantially upon the type of engine, and upon the performance required from it —viz, the volume of the larger chamber, denoted 3, may vary according to the output and revolutions envisaged for the engine in question.

The pockets 4 and 5 are located in positions corresponding to those of the inlet and exhaust valves 7 and 8, respectively, and in a preferred embodiment exhibit the shape of sector to an annulus the centre of which coindides with the centre of the crown 6 of the piston 1; both the depth and the width of the smaller pocket 4 are scaled down in relation to the same dimensions of the larger pocket 5.

Figure 2:
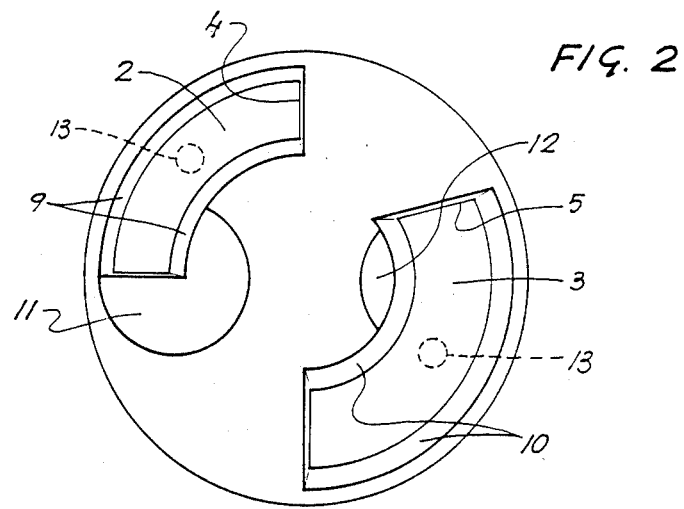
FIG. 2 shows the plan of a piston as in FIG. 1, viewed from above, in which the position of the spark plugs (where appropriate) is illustrated in broken line.

In order to enhance escape and circulation of combustion gases, the contoured side walls 9 and 10 of the pockets 4 and 5 are splayed outwards; in a preferred embodiment, however, the end walls could also be splayed in similar fashion (see FIG. 2).

Each pocket 4 and 5 of the single piston 1 is provided uppermost with a respective enlarged recess 11 and 12 designed to accommodate the relative valves 7 and 8 when these shift toward the piston 1, and when the piston approaches top dead centre.

The invention relates particularly to engines of the type incorporating spark plugs, and envisages the use of two spark plugs per cylinder, one for each of the two chambers 2 and 3; FIG. 2 shows the position of the single spark plugs 13 in broken line.

Needless to say, the exact shape and position of the two combustion chambers may be varied without prejudice to the substance of what is claimed.

The provision of two distinct combustion chambers 2 and 3 in the crown 6 of the one piston 1 permits of lowering the cylinder head 15 and favouring embodiment of the so-called square engine design. Division of the conventional in-piston chamber to create two separate chambers also enables a designer to exploit Pascal's law and thus gain a set of results which approach ideal values and provide marked advantages: a high compression ratio and high charge pressure, maximum turbulence immediately before and after combustion, and optimum combustion. Advantages such as these will in their turn provide better performance (output, speed, efficiency) than that of a conventional engine with the same cubic capacity, that is to say, a small capacity engine incorporating the improvement described herein will match the performance of a larger capacity conventional engine whilst providing the advantage of a lower emission level.

In accordance with Pascal, in fact, the total force which impinges on the single piston 1 is not merely the sum of two pressures, but the product of their multiplication.

An engine incorporating the improvement disclosed will give increased charge pressure, higher compression and greater turbulence in the cylinder, thereby optimizing combustion even with a weak fuel mixture.

By dividing the combustion chamber into two distinct entities of volume, each of which crowds the area occupied by a respective spark plug 13, one obtains compression ratios considerably in excess of 10:1.

Maximum charge pressure and maximum compression will be produced in the pocket 4 of smaller dimensions, whilst in the larger pocket 5 one has lower pressure and lower compression.

Where side valve design is employed, the two chambers 2 and 3 of each cylinder might be located in the cylinder head of the engine, instead of in the crown of the piston; such an expedient would fall likewise within the scope of the invention as claimed. If the maximum of turbulence is to be obtained however, the chambers 2 and 3 will be best located in the crown 6 of the piston 1 so as to exploit the movement of the piston in setting up such turbulence.

Operation of the improved internal combustion engine covering the four strokes of the Otto cycle, is as follows.

During the first stroke, with the inlet valve 7 open and the piston 1 moving toward bottom dead centre, fuel-air mixture is drawn into the chamber denoted 2 located beneath the valve 7 (see FIG. 1); turbulence is set up, and assisted by the splayed side walls 9 and 10, so that the mixture circulates to occupy the second chamber 3 and the rest of the cylinder.

During the second stroke, the piston 1 approaches top dead centre, whereupon the mixture is subjected to maximum compression, and pressure in the smaller chamber 2 is brought to a peak. It happens that, as a result of the same compression stroke, a relatively lower pressure level is produced in the remaining chamber 3, situated below the exhaust valve (FIG. 1), by reason of its greater volume.

During the third stroke, an ignition spark will be produced in both of the chambers 2 and 3, though the pressure differential (pressure is greater in the chamber denoted 2 by reason of its reduced size) is instrumental in setting up strong turbulence in the smaller chamber 2; thus, the ignited mixture expands first toward the larger chamber 3, via the gap 14, and then gradually occupies the entire volume of the cylinder to best possible advantage in terms of full combustion of the mixture, output and speed, hence of efficiency, which is brought that much nearer to the ideal value. In practice, the greater pressure produced in the smaller chamber 2 impinges first on the remaining, larger chamber 3, to which access is gained via the gap 14 between the crown 6 of the piston and the cylinder head 15, before filling the cylinder and urging the piston downward at maximum power and velocity.

During the fourth stroke, with the piston 1 returning to top dead centre, post-combustion gases are expelled at high speed via the exhaust valve 8, thus contributing to turbulence in the stream of fuel-air mixture drawn in for the following cycle.

What is claimed:

1. An improvement in a piston-type internal combustion engine, in particular an Otto cycle engine, giving increased performance, characterized in that use is made of a first and second separate in-piston combustion chambers formed in the crown of each piston of said engine, each of said combustion chambers being shaped as a sector of an annulus the center of which coincides with the center of the piston crown, the volume of said first combustion chamber being larger than the volume of said second combustion chamber such that during said compression stoke a pressure differential will be created between said first and said second combustion chambers, said combustion chambers located in positions corresponding, respectively, to that of an inlet valve via which fuel-air mixture is admitted, and to that of an exhaust valve via which post-combustion gases are expelled; and in that communication is enabled between said first and second combustion chambers with said piston at top dead center, by way of a gap such that a channelized flow of combustion gases is created from said first combustion chamber of larger volume to said second combustion chamber of smaller volume immediately prior to and at the moment of ignition, said gap existing between said crown of said piston and a cylinder head of said engine.

2. The improvement according to claim 1, wherein the radial width of said second combustion chamber of smaller volume is less than the radial width of the larger combustion chamber.

3. The improvement according to claim 1, wherein the depth of said second combustion chamber of smaller volume is less than the depth of the larger combustion chamber.

4. The improvement according to claim 1, wherein the walls of the two combustion chambers are splayed in order to promote swift escape and circulation of combustion gases.

5. The improvement according to claim 1, wherein each combustion chamber is provided with an enlarged recess that is provided with an enlarged recess that is shallower than said depth of each combustion chamber, and designed to accommodate a valve.

6. The improvement according to claim 1, wherein said combustion chamber of lesser volume is located in a position corresponding to the position of the inlet valve.

7. The improvement according to claim 1, for engines incorporating spark plugs, wherein one spark plug is provided for each of the two combustion chambers.

8. The improvement according to claim 1, wherein the combustion chamber of larger volume encompasses a volume at least double that of the smaller combustion chamber.

* * * * *